United States Patent

Zecchi et al.

[11] Patent Number: 5,881,860
[45] Date of Patent: Mar. 16, 1999

[54] PRODUCT CONVEYING METHOD

[75] Inventors: Marco Zecchi, Minerbio; Roberto Degli Esposti, Monte San Pietro; Mario Spatafora, Bologna, all of Italy

[73] Assignee: Azionaria Costruzioni Macchine Automatiche A.C.M.A. S.p.A, Italy

[21] Appl. No.: 824,684

[22] Filed: Apr. 8, 1997

[30] Foreign Application Priority Data

Apr. 9, 1996 [IT] Italy .................................. B062A0194

[51] Int. Cl.$^6$ .................................................. B65G 43/00
[52] U.S. Cl. ............................... 198/464.4; 198/464.3; 198/689.1; 198/470.1; 198/577
[58] Field of Search ..................... 198/464.3, 464.4, 198/470.1, 577, 689.1, 803.5

[56] References Cited

U.S. PATENT DOCUMENTS

| 3,075,630 | 1/1963 | Fisk | 198/577 |
| 3,570,647 | 3/1971 | Meikle et al. | 198/470.1 |
| 4,690,269 | 9/1987 | Takao | 198/577 |
| 4,905,818 | 3/1990 | Houseman | 198/470.1 |
| 4,915,209 | 4/1990 | Canziani | 198/464.3 |
| 4,921,398 | 5/1990 | Fluck | 198/689.1 |
| 5,097,939 | 3/1992 | Shanklin et al. | 198/577 |

Primary Examiner—William E. Terrell
Assistant Examiner—Khoi H. Tran
Attorney, Agent, or Firm—Christenson O'Connor Johnson & Kindness PLLC

[57] ABSTRACT

A method of conveying products, whereby a product is fed by a conveying device along a path to a pickup station, through which is fed a gripping member for picking up the product; the product is secured to the conveying device, and a position of the product is detected to regulate the conveying device and feed the product to the pickup station in time with the gripping member.

4 Claims, 3 Drawing Sheets

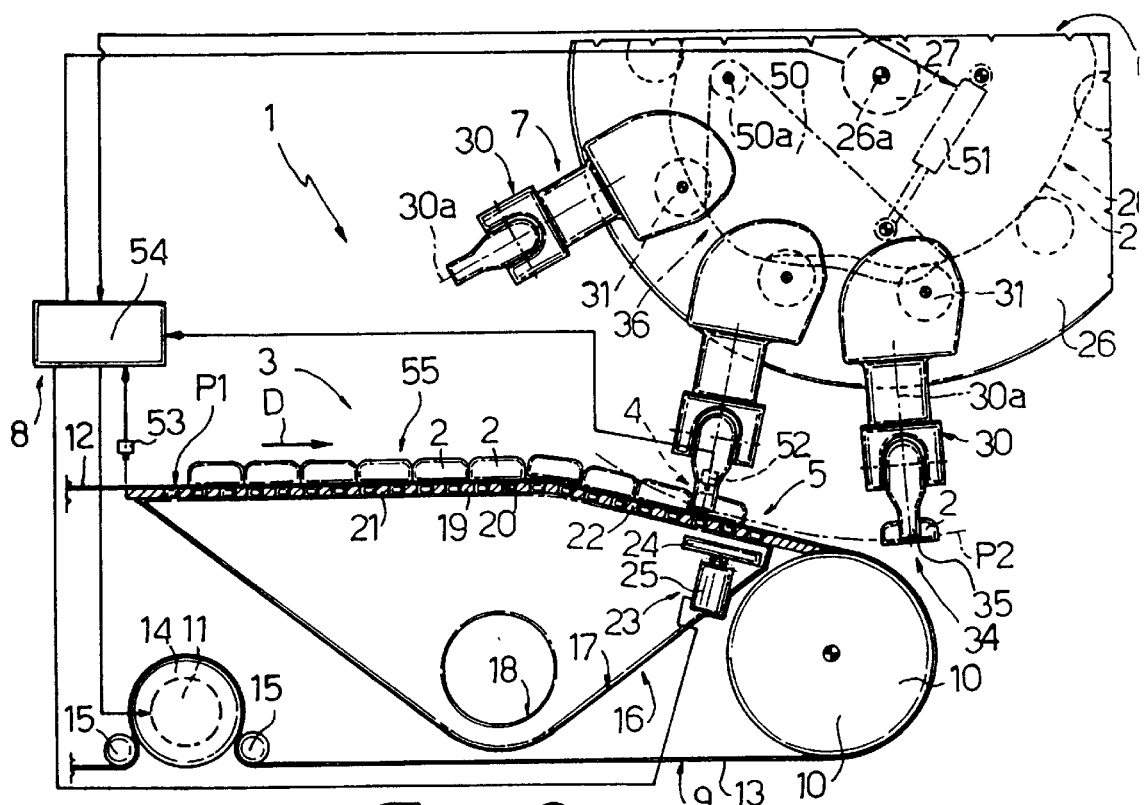
Fig. 2.
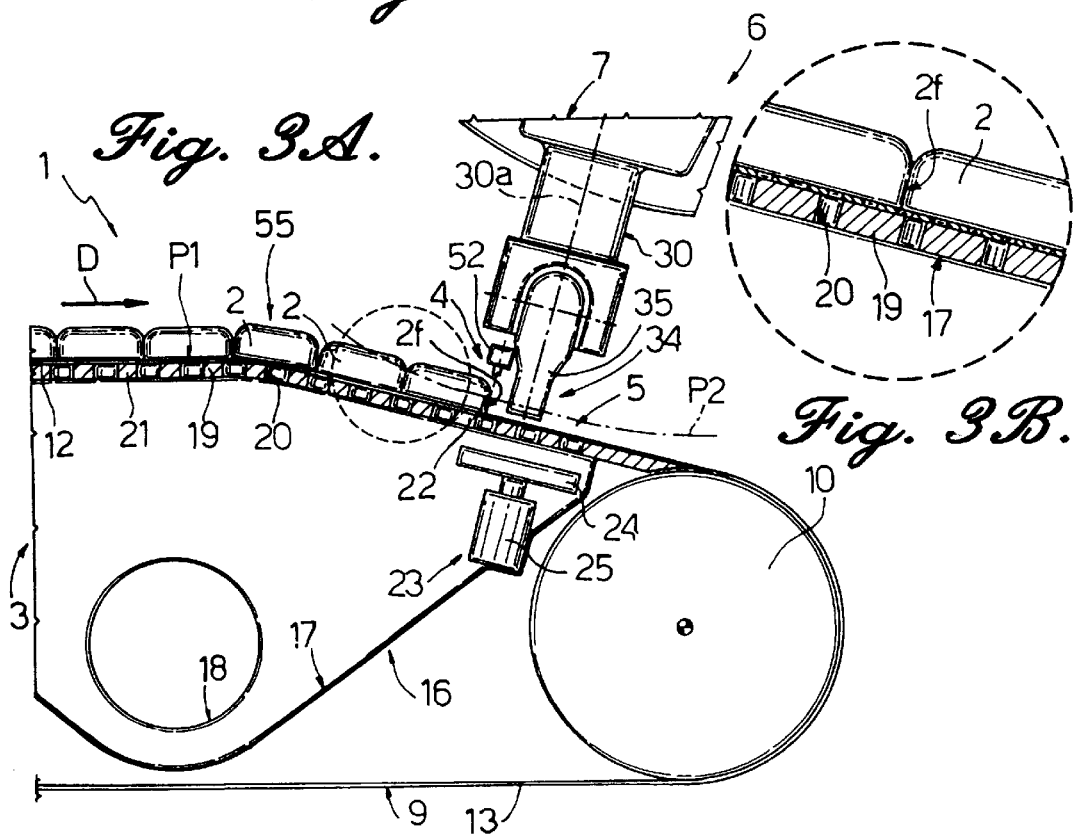
Fig. 3A.
Fig. 3B.

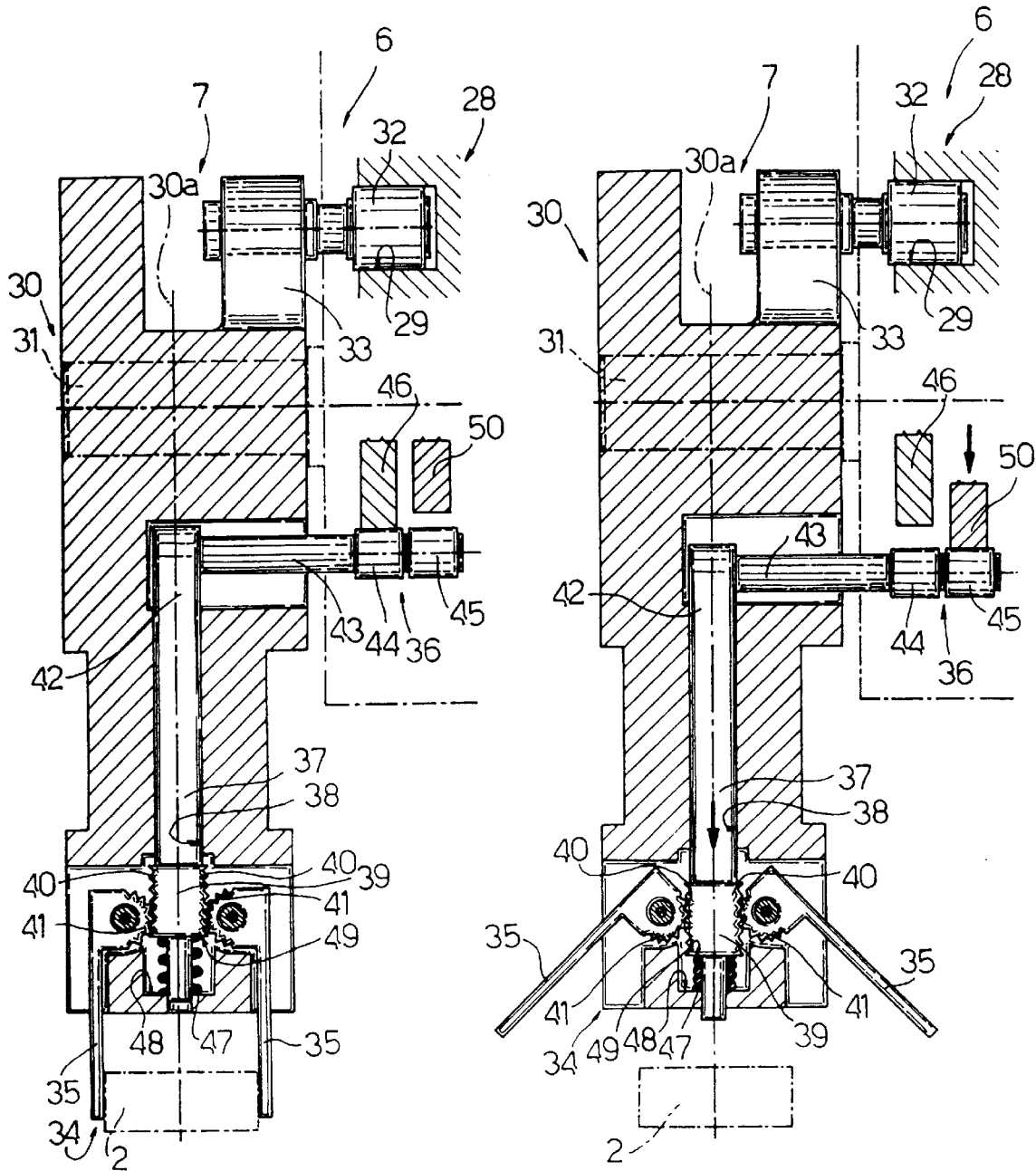
*Fig. 4A.*   *Fig. 4B.*

PRODUCT CONVEYING METHOD

BACKGROUND OF THE INVENTION

The present invention relates to a product conveying method.

More specifically, the present invention relates to a method of conveying food products such as chocolates or similar, to which the following description refers purely by way of example.

In the packaging of food products, each product is fed along a conveying line comprising a conveying device for receiving a product from a feed device and feeding the product to a pickup station, and a pickup device substantially located at the pickup station, and in turn comprising a gripping member for picking up the product at the pickup station and in turn supplying the product to a machine, such as a wrapping machine.

A drawback of known conveying lines of the above type, in which the feed device feeds the product in purely random manner to the conveying device, is that, in most cases, subsequent supply of the product to the pickup station is out of time with respect to passage of the gripping member through the station, so that the product may be gripped badly, if not altogether missed, by the gripping member.

SUMMARY OF THE INVENTION

It is an object of the present invention to provide a product conveying method designed to solve the aforementioned drawback in a straightforward, low-cost manner.

According to the present invention, there is provided a method of conveying products, the method comprising the steps of feeding a product along a first path by means of a conveying device comprising drive means for driving the conveying device, the first path extending through a pickup station at which the product is picked up; and feeding a gripping member along a second path tangent to the first path at least at said pickup station; the method being characterized by comprising the further steps of securing the product to said conveying device in a given position via retaining means; detecting said given position via detecting means located at a detecting station upstream from said pickup station along said first path; emitting a position signal; regulating said drive means, on the basis of the position signal, so that said product is fed to the pickup station in time with said gripping member; and releasing said product from said conveying device via releasing means located at the pickup station, to enable pickup of the product by said gripping member.

It should be pointed out that, on known supply lines, each product is normally fed randomly to the conveying device together with other products, so as to form a succession of products along the conveying device. More specifically, in this case, upstream from the pickup station, the conveying device arranges the products one against the other to compact the succession of products and eliminate the gaps between adjacent products. As such, the first product in the succession might simply be timed with the gripping member to enable the gripping member—or other gripping members forming part of the same pickup device and fed at regular intervals through the pickup station—to pick up all the products in the succession one after the other.

Products of the aforementioned type, however, vary in size, and, even if the difference in size is limited to a very small tolerance, compacting the products in the succession prevents them from being timed with the gripping members after timing the first product in the succession.

It is therefore a further object of the present invention to provide a conveying method as specified above, designed to also permit the supply of a succession of products.

For this purpose, therefore, in the method defined above, the product preferably forms part of a succession of products; the method repeating, for each product in said succession of products, said steps of feeding the product along said first path; feeding at least one gripping member along the second path through the pickup station; securing each product to the conveying device in a respective given position; detecting each position at said detecting station; emitting, for each detection, a position signal; regulating said drive means, on the basis of each position signal, so that each product is fed to the pickup station in time with a gripping member; and releasing each product from said conveying device via said releasing means, to enable pickup of the product.

BRIEF DESCRIPTION OF THE DRAWINGS

A non-limiting embodiment of the present invention will be described by way of example with reference to the accompanying drawings, in which:

FIGS. 2 and 3 show a larger-scale detail of FIG. 1 in two different operating positions;

FIG. 4 shows a larger-scale longitudinal section of a FIG. 1 detail in two different operating positions.

DETAILED DESCRIPTION OF THE INVENTION

Figure 1:
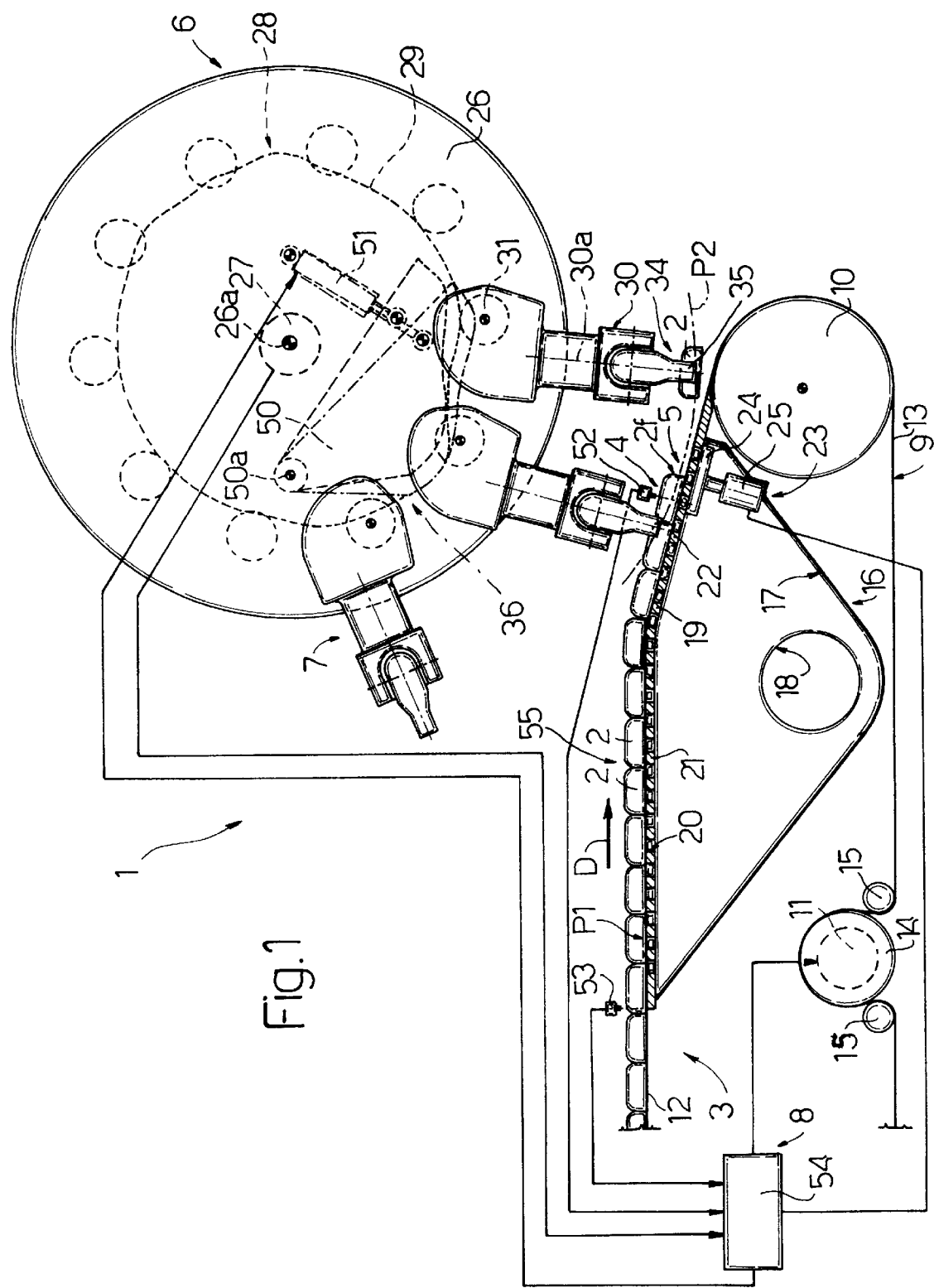
FIG. 1 shows a side view, with parts in section and parts removed for clarity, of a preferred embodiment of a product conveying line implementing the method according to the present invention.

Number 1 in FIG. 1 indicates a line for conveying products 2.

Line 1 comprises a conveying device 3 for feeding a succession of products 2 along a path P1 and in a given traveling direction D through a detecting station 4, where the position of products 2 along device 3 is detected, and for feeding products 2 to a pickup station 5 located downstream from station 4 along path P1 in the traveling direction of products 2. Line 1 also comprises a pickup device 6 in turn comprising a number of gripping heads 7, which are movable at constant speed along a substantially circular path P2 tangent to path P1 at least at station 5, and each of which provides for picking up a product 2 at station 5 and feeding product 2 to a known machine (not shown). Finally, line 1 comprises a timing assembly 8, which, as explained in detail later on, acts on device 3 to time products 2 and heads 7 in relation to one another at station 5.

Conveying device 3 comprises a conveyor belt 9 made of permeable material and looped about two transmission pulleys 10 (only one shown); and a motor 11 for driving belt 9. More specifically, pulleys 10 define on belt 9 an upper transportation branch 12 extending along path P1 and through stations 4 and 5; and a lower return branch 13 along which an output pulley 14 of motor 11 is maintained contacting belt 9 by two tensioning pulleys 15.

Device 3 also comprises a retaining device 16 for securing products 2 in contact with branch 12 of belt 9 and so preventing products 2 from slipping in relation to belt 9, and which in turn comprises a suction chamber 17, which is located inside belt 9, is connected to a known suction device (not shown) by a conduit 18, and has an upper wall 19 contacting branch 12.

More specifically, wall 19 extends for a given length L1 beneath branch 12, comprises a number of holes 20 arranged along the whole of wall 19, and has a substantially triangular longitudinal section, so as to define, on branch 12, a first horizontal flat portion 21, and a second downward-sloping flat portion 22 extending beneath stations 4 and 5.

Finally, device 3 comprises a release device 23 located at station 5 and for releasing products 2 from belt 9 to enable pickup of products 2 by heads 7. Device 23 comprises a shutter plate 24 housed inside chamber 17, and which is moved by a linear actuator 25 between a closed position (FIG. 1) in which plate 24 contacts wall 19 to close holes 20 and cut off suction at station 5, and an open position (FIGS. 2 and 3) in which plate 24 is located a given distance from wall 19 to free holes 20, permit suction through holes 20 and belt 9, and so retain a product 2 at station 5 as described in detail later on.

In addition to heads 7, pickup device 6 also comprises a conveyor wheel 26, which is rotated by a motor 27 at constant angular speed about an axis 26a crosswise to direction D, and which feeds heads 7 along path P2 about axis 26a, while at the same time imparting a given position to each head 7 by means of an orienting device 28 defined by an annular groove 29 extending about axis 26a, and which also forms part of device 6.

As shown in FIG. 4, each head 7 comprises a body 30 having an axis 30a crosswise to axis 26a, and connected in rotary and axially-fixed manner to wheel 26 by a pin 31 parallel to axis 26a. Each head 7 also comprises a tappet roller 32, which is engaged in rolling manner inside groove 29, is fitted in rotary manner to the end of an arm 33 extending from body 30 in a direction substantially parallel to axis 30a, and cooperates with device 28 to so orient respective head 7 that, in use, and at least during pickup of a product 2, axis 30a is positioned crosswise to sloping portion 22.

Each head 7 also comprises a gripping device 34 for gripping products 2, and in turn comprising two jaws 35, which are fitted to the free end of body 30, on either side of axis 30a, and which are rotated, by a control device 36 and about respective axes crosswise to axis 30a, between a closed position (FIG. 4a) in which jaws 35 are parallel to each other and to axis 30a to grip product 2, and an open position (FIG. 4b) in which at least the free ends of jaws 35 are parted by a distance greater than the width of a product 2.

Control device 36 comprises an actuating rod 37, which is movable along axis 30a inside a respective seat 38 formed in respective head 7. At the bottom end 39, rod 37 comprises two racks 40, each of which engages a respective toothed profile 41 formed on respective jaw 35 to rotate jaw 35 about the respective axis; and, at the top end 42 opposite end 39, rod 37 comprises a pin 43 integral with rod 37, extending crosswise to axis 30a from body 30 towards wheel 26, and fitted in rotary manner on its free end with two tappet rollers 44 and 45.

Roller 44 positively engages a cam 46 extending about axis 26a and for opening and closing jaws 35 by moving rod 37 inside respective seat 38 and in opposition to a closing spring 47 compressed between a stop surface 48 of seat 38 and a shoulder 49 of rod 37 defined by the two racks 40; and roller 45 positively engages a cam 50 located to the side of cam 46 along path P2 and substantially facing pickup station 5. More specifically, cam 50 is movable by a linear actuator 51, and rotates about an axis 50a, parallel to axis 26a, between a withdrawn idle position (FIG. 4a) in which it is positioned radially inwards of cam 46, and an extracted position (FIG. 4b) in which it projects radially with respect to cam 46 to engage roller 45, release roller 44 from cam 46, and so prevent jaws 35 from closing along pickup station 5.

Timing assembly 8 comprises a photocell 52 located at detecting station 4 and for detecting the passage of a product 2, in particular of an end surface 2f of product 2; and a photocell 53 facing branch 12 upstream from photocell 52 along path P1, and separated from photocell 52 by distance L1. Photocell 53 provides for determining that the length L2 of the succession of products 2 is at least equal to length L1, so that, in use, a given number of products 2 is always present between photocells 52 and 53. Assembly 8 also comprises a control unit 54, the inputs of which are connected to photocells 52, 53 and to a known encoder (not shown) associated with motor 27, and the outputs of which are connected to motor 11 of conveyor belt 9, to actuator 25 of shutter plate 24, and to actuator 51 of movable cam 50.

Operation of line 1 will first be described with reference to one product 2 and in the steady-state operating condition in which conveying device 3 feeds product 2 to pickup station 5 at a given speed V1, and pickup device 6 feeds heads 7 through station 5 at constant speed. In this condition, plate 24 is set to the closed position, and cam 50 is set to the withdrawn idle position so that jaws 35 of heads 7 traveling through station 5 are set to the closed position and grip product 2 upon product 2 reaching station 5.

In the above steady-state operating condition, as product 2 travels through detecting station 4, photocell 52 detects the passage of leading surface 2f of product 2 and supplies a signal to unit 54, which compares the signal from said encoder of motor 27 with the signal from photocell 52 to determine whether product 2 and respective gripping head 7 are in time with each other or not. If product 2 and respective head 7 are in time with each other, belt 9 feeds product 2 to station 5, where, by means of jaws 35, respective head 7 grips product 2 to feed it to said machine. Orienting device 28 so positions body 30 of head 7 that, even before actual pickup, i.e. before jaws 35 grip product 2, respective axis 30a is positioned crosswise to sloping portion 22, and jaws 35 are positioned alongside product 2 for a short distance upstream from station 5.

In the event product 2 and respective head 7 are not in time with each other, two situations are possible: product 2 is supplied to station 5 early with respect to the passage of respective head 7 through station 5; or product 2 is supplied to station 5 late with respect to head 7.

If product 2 is early with respect to head 7, control unit 54 slows down motor 11 to reduce speed V1 and so slow down supply of product 2 to station 5. Conversely, if product 2 is late, unit 54 accelerates motor 11 to increase speed V1 and so make up for the delay. Retaining device 16 ensures that, when decelerating or accelerating belt 9 as described above, product 2 is maintained contacting, and prevented from sliding along, belt 9; while plate 24 in the closed position cuts off suction through holes 20 at station 5 to enable pickup of product 2 by respective head 7.

If more than one product 2, i.e. a succession 55 of products 2, is to be supplied to station 5, the above situations are repeated in the same way for each product 2 traveling through detecting station 4; and, by means of the signals from photocell 52 and said encoder, unit 54 constantly controls the traveling speed V1 of belt 9 for each product 2 out of time in relation to respective head 7, to ensure each product 2 is timed with respective head 7, and each head 7 picks up a respective product 2.

Upon photocell 53 detecting that the length L2 of succession 55 is less than length L1, a signal is supplied by photocell 53 to unit 54, which immediately stops motor 11 to arrest the travel of succession 55 towards station 5, and so operates actuators 25 and 51 as to set plate 24 to the open position and cam 50 to the extracted position.

Due to the inertia of belt 9, this will not be arrested immediately, so that the first product 2 in succession 55 is arrested substantially at station 5 (FIG. 2) where it is also retained by the suction no longer cut off through holes 20 by plate 24. At this point, unit 54 reverses motor 11 (FIG. 3) to invert the traveling direction of products 2 along path P1 and so move at least the first product 2 in succession 55 back by a given distance, upstream from photocell 52, equal to the distance to be traveled by first product 2 upon reactivation of motor 11, which occurs when length L2 of succession 55 is made at least equal to length L1 by the supply of further products 2 by a known feed device (not shown) located upstream from conveying device 3, and by which products 2 are fed onto branch 12, are slid onto portion 22, and are gradually compacted against the remaining products 2 in succession 55.

In other words, to prevent the first product 2, during the transient stage following reactivation of motor 11, from arriving at station 5 at a different speed from heads 7, or from being shifted so far forward as to be skipped completely by heads 7, first product 2 in succession 55 must be moved back said given distance while building up length L2 of succession 55; which given distance is determined according to the characteristics of motor 11, and is controlled by photocell 52 supplying a signal to unit 54 on detecting, in this case, the rear end surface $2f$ of first product 2.

During build-up as described above, wheel 26 continues rotating about axis 26a to feed heads 7 through station 5, and, as described previously, on nearing station 5, heads 7 are positioned with axes 30a crosswise to portion 22, and with jaws 35 in the open position on either side of products 2 close to station 5. Also, during build-up, unit 54 shifts cam 50 into the extracted position to prevent jaws 35 from being closed even at station 5, and so prevent the first products 2 from being gripped by mistake and damaged by the simultaneous action of jaws 35, which tend to detach them from belt 9, and the suction of retaining device 16, which tends to hold them on belt 9.

On determining that length L2 is once more at least equal to length L1, photocell 53 supplies a further signal to unit 54, which restarts motor 11 to supply products 2 to station 5.

Continuously varying the speed V1 at which products 2 are supplied to station 5 therefore provides for timing products 2 in relation to respective gripping heads 7 in a straightforward, relatively low-cost manner. Moreover, in addition to being handled carefully, as required by the fragile nature of their surface and structure, products 2 may vary in size within a fairly wide tolerance range, due to timing depending solely on the instant in which a surface $2f$ is detected by photocell 52. Finally, opening jaws 35 during build-up provides for safeguarding the surface and structure of the products 2 supplied to said machine.

We claim:

1. A method of conveying a succession of products, the method comprising the steps of feeding said succession of products along a first path (P1) and through a pickup station by means of a conveying device comprising drive means for driving the conveying device; feeding at least one gripping member along a second path (P2) tangent to the first path (P1) at said pickup station for picking up product arranged in the pickup station; securing each product to said conveying device in a given position via retaining means; detecting each said given position via detecting means located at a detecting station upstream from said pickup station along said first path (P1); emitting for each such detection a position signal; regulating said drive means on the basis of each position signal, so that each product is fed to the pickup station in time with the relevant gripping member; and releasing each product from said conveying device via releasing means located It the pickup station, to enable pickup of the product by said gripping member; controlling a length (L2) of said succession via control means located along the first path (P1) at a given distance (L1) from said detecting station; and in the event said length (L2) is less than said given distance (L1), said drive means being arrested, said releasing means being disabled, and said drive means subsequently being activated to move at least the first product in the succession back by a further given distance in relation to the pickup station.

2. A method as claimed in claim 1, wherein each said gripping member comprises a gripping device for gripping the respective product; the gripping device being activated during the pickup of the relevant product.

3. A method as claimed in claim 2, wherein, in the event said drive means are arrested and said releasing means are disabled, said gripping device is disabled via disabling means located at said pickup station.

4. A method as claimed in claim 1, wherein during the pickup of the product, each gripping member is so oriented as to be positioned with a respective axis crosswise to the first path (P1).

* * * * *

UNITED STATES PATENT AND TRADEMARK OFFICE
CERTIFICATE OF CORRECTION

Page 1 of 2

PATENT NO. : 5,881,860
DATED : March 16, 1999
INVENTOR(S) : M. Zecchi et al.

It is certified that error appears in the above-identified patent and that said Letters Patent is hereby corrected as shown below:

| COLUMN | LINE | |
|---|---|---|
| [30] Title page | Foreign Appln. Priority Data | "B062A0194" should read --B096A0194-- |
| [56] Title page | Refs. Cited (Foreign Refs.) | after the last U.S. document cited, insert --FOREIGN PATENT DOCUMENTS<br>0 608 824 A1   08/1994   Europe<br>1 455 569         11/1976   United Kingdom<br>2 129 754 A     05/1984   United Kingdom-- |
| 2 | 28 | "FIGS. 2 and 3" should read --FIGS. 2 and 3A-- |
| 2 | 29 | after "operating positions" insert --with FIG. 3B being an enlarged detail of the section of FIG. 3A enclosed in a dashed circle-- |
| 2 | 30 | "FIG. 4 shows" should read --FIGS. 4A and 4B show-- |
| 3 | 14 | "2 and 3)" should read --2 and 3A)-- |
| 3 | 26 | "FIG. 4" should read --FIGS. 4A and 4B-- |

UNITED STATES PATENT AND TRADEMARK OFFICE
CERTIFICATE OF CORRECTION

PATENT NO.    : 5,881,860
DATED         : March 16, 1999
INVENTOR(S)   : M. Zecchi et al.

It is certified that error appears in the above-identified patent and that said Letters Patent is hereby corrected as shown below:

COLUMN         LINE

6                  28            "located It" should read --located at--
(Claim 1,   line 17)

Signed and Sealed this

Twenty-eighth Day of September, 1999

Attest:

Q. TODD DICKINSON

Attesting Officer          Acting Commissioner of Patents and Trademarks